United States Patent [19]

Bonk et al.

[11] 4,420,602

[45] Dec. 13, 1983

[54] MELT-POLYMERIZATION PROCESS FOR THE PREPARATION OF THERMOPLASTIC POLYAMIDES AND POLYESTERAMIDES

[75] Inventors: Henry W. Bonk, Wallingford; Robert G. Nelb, II, North Haven; Richard W. Oertel, III, Guilford, all of Conn.

[73] Assignee: The Upjohn Company, Kalamazoo, Mich.

[21] Appl. No.: 424,418

[22] Filed: Sep. 27, 1982

[51] Int. Cl.$^3$ .............................................. C08G 18/32
[52] U.S. Cl. ...................................... 528/80; 528/85; 528/480; 528/501; 528/502
[58] Field of Search .................... 528/80, 85, 501–502, 528/480

[56] References Cited

U.S. PATENT DOCUMENTS

| | | | |
|---|---|---|---|
| 3,477,094 | 11/1969 | Maahs et al. | 18/2 |
| 3,492,791 | 2/1970 | Evans | 55/36 |
| 3,493,031 | 2/1970 | Williams et al. | 159/2 |
| 3,773,738 | 11/1973 | Porter et al. | 260/78 R |
| 3,833,546 | 9/1974 | Takekoshi et al. | 260/47 CP |
| 4,011,198 | 3/1977 | Takekoshi et al. | 260/47 CP |
| 4,073,773 | 2/1978 | Banucci et al. | 260/47 CP |
| 4,087,481 | 5/1978 | Onder | 260/857 TW |
| 4,096,129 | 6/1978 | Cook | 528/85 X |
| 4,115,372 | 9/1978 | Onder | 528/73 |
| 4,153,501 | 5/1979 | Fink et al. | 528/501 X |
| 4,156,065 | 5/1979 | Onder et al. | 528/51 |
| 4,371,684 | 2/1983 | Quiring et al. | 528/85 X |
| 4,385,171 | 5/1983 | Schnabel et al. | 528/501 X |

*Primary Examiner*—Lucille M. Phynes
*Attorney, Agent, or Firm*—Denis A. Firth; John Kekich

[57] ABSTRACT

A melt-polymerization process is described for the preparation of thermoplastic polyamides and polyesteramides by reaction of the appropriate organic diisocyanate and dicarboxylic acid or difunctional carboxylic acid-terminated polyol. The process, which can be conducted in a batch or continuous manner, comprises the steps of admixing the reactants (preferably in the liquid state), heating the mixed reactants at reaction temperature in a manner such that eliminated carbon dioxide can be vented freely, allowing the reaction to proceed until approximately 25–95 percent (preferably at least 50 percent) of the theoretical carbon dioxide has been eliminated and reducing the resulting intermediate to a powder before completing the reaction by melting, homogenizing, and devolatilizing.

14 Claims, No Drawings

MELT-POLYMERIZATION PROCESS FOR THE PREPARATION OF THERMOPLASTIC POLYAMIDES AND POLYESTERAMIDES

BACKGROUND OF THE INVENTION

1. Field of the Invention

This invention relates to a process for the preparation of polyamides and related compounds from organic isocyanates and dicarboxylic acids and is more particularly concerned with a melt polymerization process for the reaction of organic diisocyanates with dicarboxylic acids and related compounds.

2. Description of the Prior Art

The preparation of polyamides, i.e., polymers which contain a recurring amide linkage, by reaction of organic diamines with dicarboxylic acids and derivatives thereof such as acid chlorides, is well-known in the art. Such processes include solvent-free reactions in which the polymer is produced by melt condensation of the reaction components. Where the reactants are diamines and dicarboxylic acids, the reaction produces water of condensation and a number of methods of separating the water as steam from the reaction mixture are known. Illustrative of such methods and apparatus for achieving the result are those described in U.S. Pat. Nos. 3,477,094; 3,492,791; 3,493,031; and 3,773,738.

More recently the production of polyamides by reaction of organic diisocyanates with dicarboxylic acids and related compounds have been described; see, for example, U.S. Pat. Nos. 4,087,481; 4,115,372; and 4,156,065. In the case of these latter reactions the condensation results in the elimination of carbon dioxide. Hitherto, the reaction has been conducted in the presence of inert organic solvents. However, for commercial production the use of organic solvents of the type required is extremely undesirable both from the point of view of economics and from the requirement to avoid pollution of the atmosphere by discharge of such solvents from production facilities.

So far as Applicants know, no method has previously been described which enables the reaction between the diisocyanate and the dicarboxylic acid to be carried out in the absence of such organic solvents. In particular, no such solvent-free reaction which can be operated on a continuous or semi-continuous basis has been described.

It is an object of the present invention to provide a process which can be carried out in the absence of inert organic solvents and which can be used to produce polymers containing amide linkages by reaction of organic diisocyanates with dicarboxylic acids or related compounds. It is a further object of the present invention to provide a continuous or semi-continuous process for carrying out this reaction.

SUMMARY OF THE INVENTION

This invention comprises a process for the preparation, in the absence of inert organic solvent, of a thermoplastic polymer which is characterized by a recurring amide linkage, which process comprises the steps of:
intimately mixing an organic diisocyanate and a dicarboxylic acid in substantially stoichiometric proportions in the absence of organic solvent;
subjecting the reaction mixture to a temperature in the range of about 100° C. to about 230° C. until from about 25 to about 95 percent of the theoretical amount of carbon dioxide necessary to achieve complete reaction has been evolved;
and completing the formation of the thermoplastic polymer by melting the intermediate so formed and homogenizing and degassing the melt.

The process of the invention also comprises a continuous process for carrying out the above reaction which process comprises mixing the organic diisocyanate and dicarboxylic acid, advantageously in the liquid state, and feeding the mixed reactants in a continuous manner on to a continuously moving endless conveyor belt, passing the mixed reactants on said belt through a heating zone maintained at the appropriate reaction temperature and adjusting the residence time in the heating zone so that from approximately 25 to about 95 percent of the carbon dioxide, theoretically necessary to be eliminated in order to achieve complete reaction, has been evolved, and then continuously conveying the intermediate, optionally via a comminution zone, to a zone in which the formation of the desired polymer is completed by continuously degassing and melt extruding said intermediate.

DETAILED DESCRIPTION OF THE INVENTION

The reaction between an organic diisocyanate and a dicarboxylic acid can be represented schematically as follows:

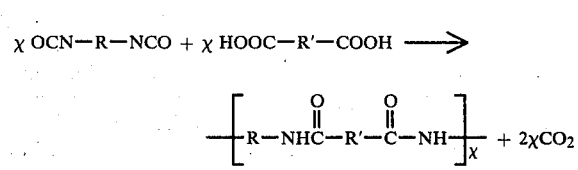

wherein R is the residue of the organic polyisocyanate and R' is the residue of the dicarboxylic acid. It will be seen that the reaction gives rise to two moles of carbon dioxide for the reaction of each mole of diisocyanate and dicarboxylic acid. The venting of this carbon dioxide can be controlled reasonably will when the reaction is conducted in an inert organic solvent, particularly in a batch procedure. However, the venting of the carbon dioxide presents a somewhat greater problem when the reaction is attempted in the absence of a solvent, particularly if the reaction is to be carried out on a continuous basis. Attempts to carry out the reaction in, for example, a continuous reactor lead to severe mechanical problems since the evolution of the carbon dioxide in the molten liquid reaction mixture tends to cause foaming with consequent blocking of any vents which might be provided in the reactor.

We have now found that the various problems associated with seeking to carry out the reaction between the diisocyanate and the dicarboxylic acid in the absence of solvent can be overcome in a very convenient manner by carrying out the process in accordance with the present invention. In particular we have found that the process can be carried out successfully on a continuous or semi-continuous basis to give polymers which have all the desirable properties hitherto associated with the corresponding polymers produced in the presence of inert organic solvent.

The key to success of the process is to conduct the reaction between the diisocyanate and the dicarboxylic acid in such a way that the reaction mixture is spread as

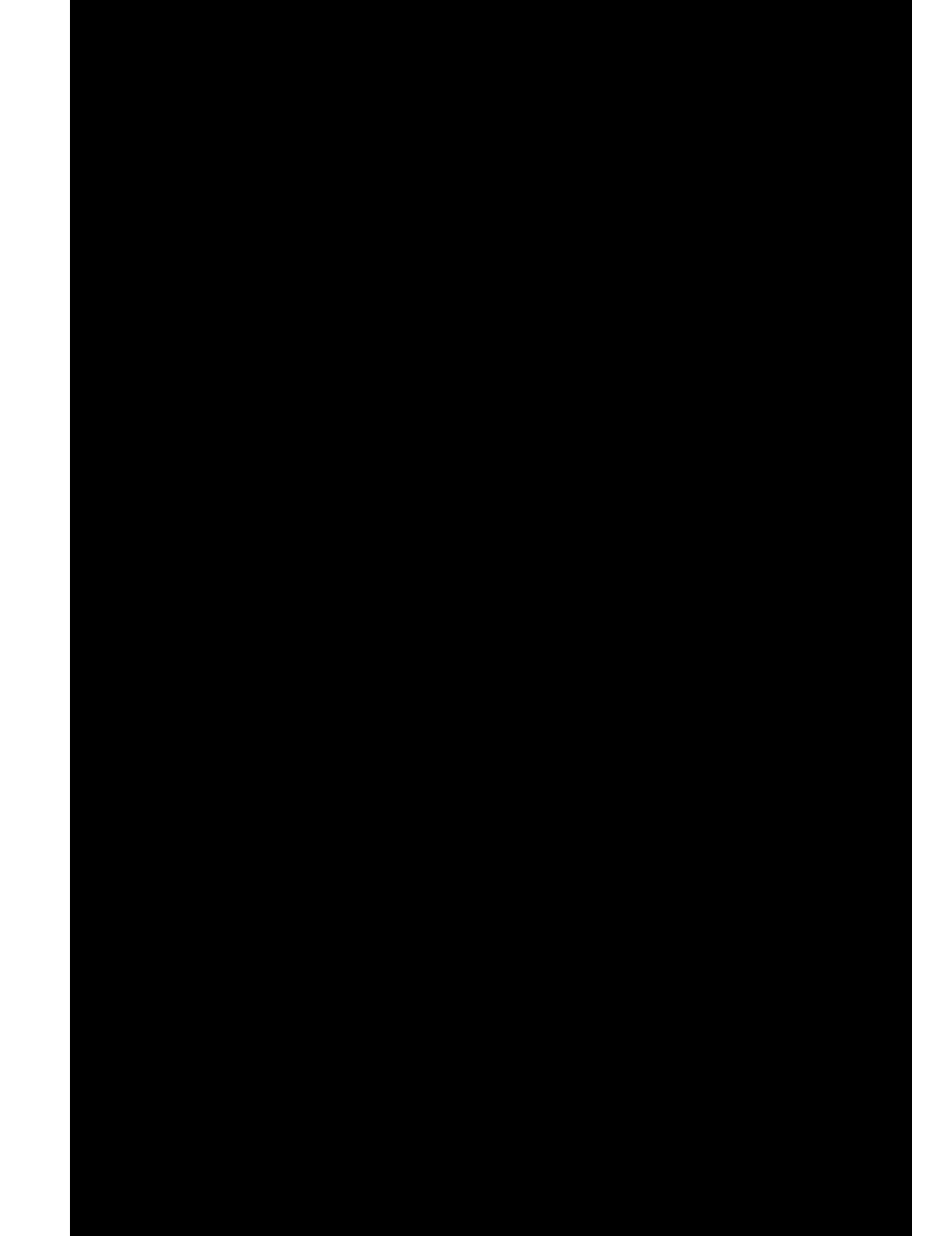

methylene diisocyanate, 4,4'-methylenebis(cyclohexyl isocyanate), 1,5-naphthalene diisocyanate, 1,4-diethylbenzene-$\beta,\beta'$-diisocyanate, as well as mixtures of any two or more of said diisocyanates.

Any of the dicarboxylic acids previously employed in the art to prepare polyamides can be employed in the process of the invention. Illustrative of said acids are aromatic dicarboxylic acids such as isophthalic, terephthalic, phthalic, benzophenone dicarboxylic and diphenylene dicarboxylic acids and the like; aliphatic dicarboxylic acids such as succinic, adipic, azelaic, pimelic, glutaric, sebacic, decanedioic, dodecanedioic and brassylic acids and the like. A mixture of two or more of the above acids can be employed if desired.

The dicarboxylic acid-terminated prepolymers which are employed in preparing thermoplastic polyesteramides in accordance with the process of the invention can be prepared in a variety of ways. Illustratively the prepolymers can be obtained by reacting an excess (the magnitude of which depends on the final molecular weight desired) of a dicarboxylic acid, which can be any of those described and identified above including mixtures of two or more of said acids, with a monomeric or polymeric diol. The monomeric diols can be any of those conventionally employed in the preparation of polyester diols. Illustrative of monomeric diols are ethylene glycol, propylene glycol, 1,4-butanediol, 1,2-hexanediol, 1,5-pentanediol, and the like.

The polymeric diols which are employed in the preparation of the carboxylic acid-terminated prepolymers as described above, can be any polyether or polyester diols having molecular weights within the range of about 400 to about 4000. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like and copolymers of said alkadienes with vinyl monomers such as acrylonitrile, methacrylonitrile, styrene, and the like. Particularly preferred polyether diols for use in preparing the polyester amides of the invention are poly(tetramethylene glycol) and ethylene oxide capped polypropylene glycols wherein the ethylene oxide content is within the range of about 5 percent to about 40 percent.

Illustrative of the polyester diols are those obtained by reacting a dicarboxylic acid or a mixture of dicarboxylic acids such as adipic, suberic, azelaic, glutaric, 1,12-dodecanedioic acids, and the like, with an excess, over the stoichiometric amount, of a dihydric alcohol such as ethylene glycol, propylene glycol, 1,4-butanediol, and the like, including mixtures of two or more such diols.

The polyamides and polyesteramides which are prepared in accordance with the process of the present invention can be employed in any of the many applications which have already been established for the same polyamides and polyesteramides which were prepared in the presence of inert organic solvents in accordance with procedures already known in the art. Such applications include molding by extrusion of hose, tubing, wire coating and the like, and injection molding to produce articles such as bushings, seal faces, compressor vanes and impellers, pistons and piston rings, gears, thread guides, cams, brake linings, clutch faces, abrasive articles and the like.

The following examples describe the manner and process of making and using the invention and set forth the best mode contemplated by the inventors of carrying out the invention but are not to be construed as limiting.

EXAMPLE 1

A mixture of 65.87 g. (0.7 equivs.) of azelaic acid and 21.9 g. (0.3 equivs.) of adipic acid was heated until molten and was then dehydrated by heating under vacuum for 30 minutes at 120° C. in the presence of 0.5% w/w antioxidant (Irganox 1098). The resulting mixture was poured into an open beaker and 0.625 g. of a mixture of 1,3-dimethyl-2-phospholene-1-oxide and 1,3-dimethyl-3-phospholene-1-oxide was added. To the molten mixture at 120° C. was added, slowly with vigorous stirring, a total of 125 g. (1 equiv.) of molten 4,4'-methylenebis(phenyl isocyanate). The resulting mixture was subjected to stirring by hand. The mixture finally solidified as coarsely foamed mass. At this point approximately 70 percent of the amount of carbon dioxide which could theoretically be eliminated by the reaction had been lost (as measured by weight loss). The product so obtained was then crushed to a coarse particulate form and was charged to the mixing head of a C. W. Brabender Plasticorder maintained at 280° C. The port of the mixing head was left open to allow liberated carbon dioxide to vent to the atmosphere. Mixing of the molten mass was continued in the mixing head until evolution of gas substantially ceased. An increase in torque on the drive shaft of the mixing head evidenced the occurrence of polymerization. The resulting product was removed from the mixing head as a brown solid and was determined, by gel permeation chromatography usin a polystyrene standard, to have a weight average molecular weight of 103,811.

EXAMPLE 2

A mixture of 140 g. (1.49 equivs.) of azelaic acid, 46.5 g. (0.64 equivs.) of adipic acid, 4.71 g. (0.016 equivs.) of stearic acid and 0.75 g. of antioxidant (Irganox 1098) was heated until molten at 120° C. and the mixture was dehydrated by maintaining the same temperature under vacuum for 30 minutes. The resulting mixture was maintained at the same temperature and vigorously stirred while 0.5 g. of a mixture of 1,3-dimethyl-2-phospholene-1-oxide and 1,3-dimethyl-3-phospholene-1-oxide followed by 207.6 g. (1.66 equivs.) of molten 4,4'-methylenebis(phenyl isocyanate) was added. The stirring was continued for approximately 90 seconds before pouring the molten reaction mixture into an open tray (5"×9"). The tray containing the reaction mixture (ca ½-¾" thickness) was then placed in a vacuum oven maintained at 220° C. and was kept in the oven under vacuum for 30 minutes. The resulting intermediate was allowed to cool to room temperature (circa 20° C.) and the resulting coarse foam was granulated using a Waring blender. The coarse powder so derived was then dried for 2 hours at 100° C. under vacuum to remove any surface moisture and the dried powder was then passed through a twin screw extruder (Werner-Pfleiderer ZDS K-28) equipped with 2 vent ports. The vent and feed ports were purged by a stream of dry nitrogen during the whole of the process. The shafts of the apparatus were rotated at 45 rpm and the temperature in the 5 independently heated zones was as follows:
Feed zone: 560° F.
Zone 2: 565° F.
Zone 3: 560° F.
Zone 4: 520° F.
Zone 5: 545° F. (Die Zone)

The finished polymer was extruded as a ribbon and pelletized and dried in a dehumidifying hopper dryer. The polymer was determined, by gel permeation chromatography using a polystyrene standard, to have a weight average molecular weight of 126,800. Tensile bars, in accordance with ASTM D-638 Type 1 of the polymer were obtained by injection molding and were found to have the following properties.
Tensile strength: 7010 psi
Elongation: 4%
Notched Izod Impact: 1.31 ft lbs/in. ($\frac{1}{8}$")

EXAMPLE 3

The carboxylic acid-terminated hexamethylene adipate, employed in the procedure described in this Example, was prepared as follows:

To a 500 gallon reactor was charged 1614 lb. of hexamethylene adipate diol [Rucoflex S105-110; Hooker; Eq. wt ca500], 345 lb. of azelaic acid, 265 lb. of adipic acid (Du Pont), 717 g. p-toluene sulfonic acid monohydrate, and 1081 lb. xylenes. The reaction solution was heated to the reflux temperature and the water evolved from the condensation reaction was removed by azeotropic distillation. At the completion of the reaction the reactor contents were cooled to 100°–120° C. and the xylenes were removed by vacuum distillation. The product, 2169 lbs., had an acid number of 103 (Eq. wt.=545).

A mixture of 1405.3 g. (2.58 equivs.) of a carboxylic acid-terminated hexamethylene adipate prepared as described above, 291.3 g. (3.1 equivs.) of azelaic acid, 24.2 g. of Irganox 1098 and 12.1 g. of lubricant (Advawax 280) was heated at 120° C. for 1 hour to dehydrate the mixture. An aliquot (352.8 g.; 1.156 equivs.) of the resultant mixture was treated, in the molten state, with 0.7 g. of a mixture of 1,3-dimethyl-2-phospholene-1-oxide and 1,3-dimethyl-3-phospholene-1-oxide followed by 147.2 g. (1.173 equivs.) of molten 4,4'-methylenebis(phenyl isocyanate) with vigorous mechanical stirring. The stirring was continued for 60–90 seconds before pouring the resultant mixture into an open pan (5"×9"). The pan and contents were placed in a vacuum oven maintained at 220° C. and the product was allowed to remain in the oven under vacuum for 30 minutes. The resulting product was a partially polymerized intermediate in the form of a coarse foam. This intermediate was allowed to cool to room temperature (circa 20° C.) and then was granulated using a commercial rotating knife granulator and the granulated material was dried in a dehumidifying drier. The granulated intermediate was then treated, using the apparatus and procedure described in Example 2 above, to complete the polymerization and to extrude the finished polymer with the exception that the screw speed was increased to 60 rpm, the residence time was approximately 3 minutes and the temperature maintained in the various zones was as follows:
Feed zone: 560° F.
2nd zone: 560° F.
3rd zone: 560° F.
4th zone: 555° F.
5th zone: 530° F. (die zone)

The polymer so extruded was pelletized and dried. The polymer was a light brown clear material which was determined, by gel permeation chromatography, to have a weight average molecular weight of 210,312 (using a polystyrene standard). The inherent viscosity of the polymer was 0.89 dl/g. in N-methylpyrrolidone. Test sheets ($4\frac{3}{4}"\times 4\frac{3}{4}"\times 1/16"$) were prepared by injection molding and found to have an average tensile strength of 3200 psi.

The first step in the above described reaction was repeated using a second aliquot of the same premix and adding the catalyst and diisocyanate as described above. However, the reaction mixture, after vigorous stirring for about 1 minute, was allowed to stand in an open container (one gallon tub) placed on a weighing balance. No further heat was supplied to the reaction mixture during this period and the weight loss over a period of time was recorded. From the weight loss figures the amount of carbon dioxide vented to the atmosphere was computed as a percentage of the theoretical amount which would be evolved if the reaction went to completion. The values so calculated were as follows.

| Time after mixing (min.) | % carbon dioxide evolved |
| --- | --- |
| 2 | 14.5 |
| 3 | 22.0 |
| 4.22 | 31.0 |
| 5 | 35.3 |
| 6 | 40.0 |
| 10 | 48.8 |
| 17.5 | 53.2 |

EXAMPLE 4

The dicarboxylic acid-terminated tetramethylene azelate prepolymer employed in the following example was prepared as follows:

A mixture of 1000 g. (10.41 equivs.) of azelaic acid, 360.04 g. (7.99 equiv.) of 1,4-butanediol and 2 g. of tetrabutyltitanate was heated under nitrogen at reflux temperature using a Dean Stark apparatus to separate water of condensation eliminated in the reaction. The theoretical quantity of water had been collected after approximately 90 minutes. The reaction product was then heated at 225° C. for 30 minutes under vacuum before being cooled to approx. 100° C. The cooled product was stirred for 1 hr. with 30 g. of filter aid (HyFlo Super Cel: Johns Manville) before being filtered. The resulting acid-terminated tetramethylene azelate was found to have an equivalent weight of 425.1.

A mixture of 50.03 g. (0.118 equiv.) of the above prepolymer, 7.12 g. (0.075 equivs.) of azelaic acid, 5.16 g. (0.07 equiv.) of adipic acid, 0.4 g. of antioxidant (Irganox 1098), 0.1 g. of organosilicone surfactant (DC-200) and 33.80 g. (0.27 equiv.) of 4,4'-methylenebis(phenyl isocyanate) was prepared by melting the reactants with stirring. To the white paste so obtained was added, with vigorous stirring, 0.18 g. of a mixture of 1,3-dimethyl-2-phospholene-1-oxide and 1,3-dimethyl-3-phospholene-1-oxide. The resulting mixture was transferred portionwise to the mixing head of a Brabender Plasticorder maintained at 250° C. The port of the mixing head was left open to allow liberated carbon dioxide to vent to the atmosphere. After the addition was complete, the temperature of the reaction mixture was increased to 285° C. and mixing was continued at this temperature for a further 20 minutes. The resulting polymer was removed from the mixing chamber as a brown solid and was found to have an inherent viscosity of 0.85 dl/g (0.5% in N-methylpyrrolidone at 30° C.). A film of thickness 16 mils was prepared from the polymer by compression molding at 245° C. The following physical properties were determined on the film.

| Modulus at | 50% | 1900 psi |
|---|---|---|
|  | 100% | 2250 psi |
|  | 300% | 5800 psi |
| Tensile Strength |  | 7450 psi |
| Elongation |  | 360% |
| Tensile Set |  | 60% |

EXAMPLE 5

An azelaic/adipic acid capped tetramethylene adipate was prepared as follows:

To a 100 gallon reactor was charged 63 lb. of 1,4-butanediol, 171.5 lb. of azelaic acid, 191.1 lbs. of xylenes, and 104.4 g. p-toluene sulfonic acid as a catalyst. The reaction solution was heated to the reflux temperature and the water of condensation from the esterification was removed by azeotropic distillation. At the completion of the reaction the xylenes were removed by vacuum distillation. The product, 205 lb., had an acid number of 109 (Eq. wt.=515).

A mixture of 515 g. (1 equiv.) of the above prepolymer, 112.5 g. (1.2 equivs.) of azelaic acid, 3.2 g. of antioxidant (Irganox 1098) and 3.2 g. of lubricant (Advawax 280) was prepared by melting the components and the molten mixture was degassed by heating at 120° C. for 1 hour under vacuum. The resulting mixture was poured into an open polypropylene beaker and stirred vigorously while 3.2 g. of a mixture of 1,3-dimethyl-2-phospholene-1-oxide and 1,3-dimethyl-3-phospholene-1-oxide was added followed by 275 g. (2.2 equiv.) of molten (60° C.) 4,4'-methylenebis(phenyl isocyanate). Reaction ensued immediately. The temperature of the mixture was approximately 100° C. When the initial evolution of carbon dioxide had subsided (circa 60% of theoretical eliminated at this point) the resulting product, in its container, was transferred to an oven maintained at 100° C. and was kept in the oven for 5 minutes. The intermediate so obtained was then granulated and an aliquot was charged to the mixing head of a Brabender Plasticorder preheated to 220° C. The port of the mixing head was left open to the atmosphere to allow carbon dioxide to vent freely. Mixing was continued until gassing substantially ceased. A marked increase in torque load on the shaft of the mixing head indicated polymer formation. Polymer formation was completed by raising the temperature of the mixing chamber to 235° C. for a short period. There was thus obtained a brown polymer free of bubbles.

We claim:

1. A process for the preparation, in the absence of inert organic solvent, of a thermoplastic polymer which is characterized by a recurring amide linkage which process comprises the steps of:
    intimately mixing an organic diisocyanate and a dicarboxylic acid in substantially stoichiometric proportions;
    subjecting the reaction mixture to a temperature in the range of about 100° C. to about 230° C. until from about 25 to about 95 percent of the theoretical amount of carbon dioxide necessary to achieve complete reaction has been evolved;
    and completing the formation of the thermoplastic polymer by melting the intermediate so formed and homogenizing and degassing the melt at a temperature in the range of above about 230° C. but below that at which degradation of the polymer occurs.

2. A process according to claim 1 wherein the homogenizing of the melt is achieved by extrusion of the polymer.

3. A process according to claim 1 in which the heating of the initial reaction mixture is continued until at least 50 percent of the theoretical amount of carbon dioxide has been evolved.

4. A process according to claim 1 wherein the organic diisocyanate and the dicarboxylic acid are admixed in the molten state.

5. A process according to claim 1 wherein the dicarboxylic acid is selected from the group consisting of aromatic dicarboxylic acids, aliphatic dicarboxylic acids, carboxylic acid-terminated polyols and mixtures of any two or more such acids.

6. A process according to claim 1 wherein the heating of the initial mixture of reactants is carried out in a reaction zone from which evolved gases are readily vented.

7. A process according to claim 6 wherein said reaction zone comprises an open tray which is heated to a temperature such that the temperature of the reaction mixture lies within the range of about 100° C. to about 230° C.

8. A continuous process for the preparation, in the absence of an inert organic solvent, of a thermoplastic polymer which is characterized by a recurring amide linkage which process comprises the steps of:
    continuously feeding an organic diisocyanate and a dicarboxylic acid in the liquid state and in substantially stoichiometric proportions to a mixing zone at a temperature less than that at which any significant reaction occurs;
    mixing said reactants in said mixing zone and continuously passing said mixed reactants to a continuously moving endless conveyor belt;
    passing said mixed reactants on said moving conveyor belt through a heating zone maintained at a temperature in the range of about 100° C. to about 230° C. the residence time in said heating zone being adjusted so that between about 25 percent to about 95 percent of the theoretical amount of carbon dioxide necessary to achieve complete reaction has been evolved;
    continuously conveying the intermediate so produced to a comminution zone and subjecting the product to comminution; and
    completing the formation of the desired polymer by continuously melt extruding the comminuted material at a temperature above about 230° C. but below that at which degradation of the polymer occurs.

9. A process according to claim 8 wherein the residence time in said heating zone is adjusted so that at least 50 percent of the theoretical amount of carbon dioxide has been evolved.

10. A process according to claim 8 wherein the dicarboxylic acid is selected from the group consisting of aromatic dicarboxylic acids, aliphatic dicarboxylic acids, carboxylic acid-terminated polyols and mixtures of any two or more of such acids.

11. A process according to claim 1 or 8 wherein the organic polyisocyanate is 4,4'-methylenebis(phenyl isocyanate) and the dicarboxylic acid is a mixture of adipic acid and azelaic acid.

12. A process according to claim 11 wherein the dicarboxylic acid component also comprises a dicarboxylic acid-terminated tetramethylene azelate.

13. A process according to claim 1 or 8 wherein the organic polyisocyanate is 4,4'-methylenebis(phenyl isocyanate) and the dicarboxylic acid is a mixture of azelaic acid and a dicarboxylic acid-terminated hexamethylene adipate.

14. A process according to claim 1 or 8 wherein the organic polyisocyanate is 4,4'-methylenebis(phenyl isocyanate) and the dicarboxylic acid component is a mixture of azelaic acid, adipic acid and a dicarboxylic acid terminated tetramethylene azelate.

* * * * *